United States Patent [19]
Bjerke

[11] Patent Number: 5,926,868
[45] Date of Patent: Jul. 27, 1999

[54] QUICK CONNECT WATER FLOW SYSTEM

[76] Inventor: Thomas E. Bjerke, 1788 Duffield La., Alexandria, Va. 23307

[21] Appl. No.: 08/992,213

[22] Filed: Dec. 17, 1997

[51] Int. Cl.⁶ ........................................................ E03C 1/04
[52] U.S. Cl. ........................ 4/675; 4/615; 4/678; 137/801
[58] Field of Search ............................... 4/675, 676, 677, 4/678, 668, 615, 567, 568, 518; 137/218, 515, 801, 215–217, 843, 859; 239/588; 285/8

[56] References Cited

U.S. PATENT DOCUMENTS

| | | |
|---|---|---|
| 2,608,412 | 8/1952 | Bletcher et al. . |
| 2,638,382 | 5/1953 | Evans et al. . |
| 2,647,798 | 8/1953 | Ballard . |
| 3,131,868 | 5/1964 | Coleman . |
| 3,136,570 | 6/1964 | Lee . |
| 4,198,080 | 4/1980 | Carpenter . |
| 5,024,419 | 6/1991 | Mulvey . |
| 5,046,763 | 9/1991 | Martucci et al. . |
| 5,070,553 | 12/1991 | Chambers . |
| 5,361,431 | 11/1994 | Freier et al. . |
| 5,478,046 | 12/1995 | Szabo . |
| 5,577,706 | 11/1996 | King . |
| 5,608,928 | 3/1997 | Wang . |
| 5,634,624 | 6/1997 | Lacroix et al. . |

FOREIGN PATENT DOCUMENTS

| | | |
|---|---|---|
| 2 067 697 | 7/1981 | United Kingdom . |
| 2 223 961 | 4/1990 | United Kingdom . |

*Primary Examiner*—Henry J. Recla
*Assistant Examiner*—Tuan Nguyen
*Attorney, Agent, or Firm*—Nixon & Vanderhye

[57] ABSTRACT

The bathtub shower system includes a fitting for screwthreaded connection to the bathtub faucet. The fitting cooperates with a backflow preventer assembly, including a quick connect/disconnect such that the backflow assembly can be readily and easily connected to or disconnected from the fitting. The backflow preventer assembly is coupled to a shower head hose for use by an individual reclining or sitting in a bathtub. The backflow preventer assembly prevents siphoning of water from the tub to the water supply in the event the water supply is curtailed or suctions the tub faucet. The quick connect/disconnect enables the shower system to be removed from the bathtub faucet while permitting the bathtub faucet to operate in a conventional manner.

8 Claims, 4 Drawing Sheets

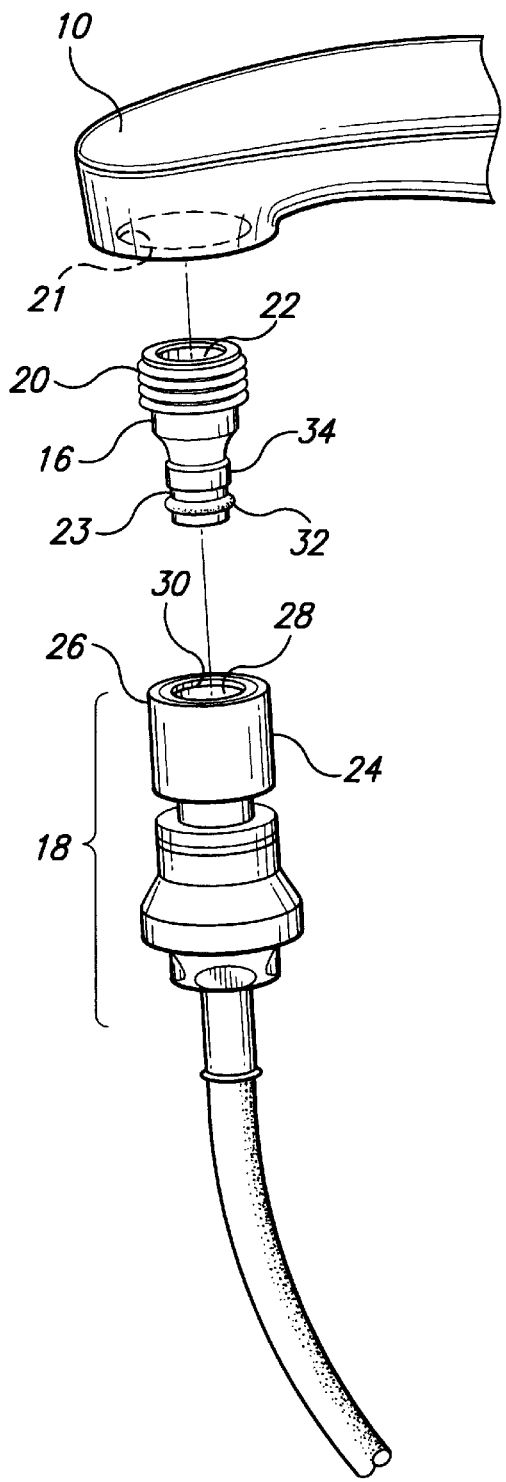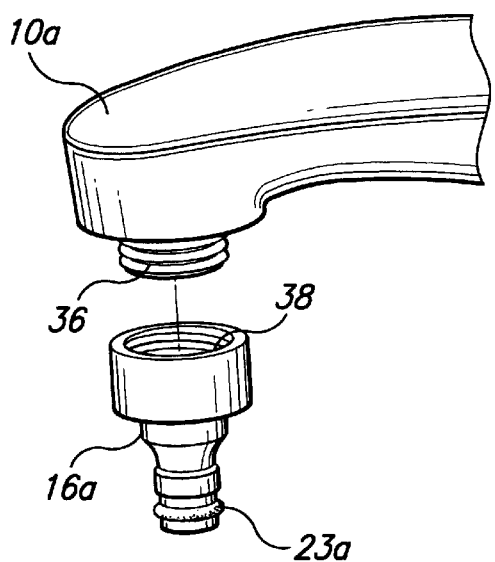
Fig. 2
Fig. 2a

QUICK CONNECT WATER FLOW SYSTEM

TECHNICAL FIELD

The present invention relates to a water flow system for use in a water-supplied container, e.g., a bathtub and particularly to a bathtub shower system for quick and easy connection to and disconnection from the bathtub water faucet and including a backflow preventer connected to a hose carrying a shower spray nozzle, e.g., various massage shower nozzles with multiple spray patterns and with various shut-off and flow control mechanisms.

BACKGROUND OF THE INVENTION

Many individuals prefer using a bathtub rather than a shower for bathing purposes. Frequently, however, there is a need for a shower-type spray nozzle, e.g., when rinsing hair. In those bathrooms having a bathtub with a shower head at one end of the tub, the shower head is typically too high on the wall to provide the individual using the bath, rather than the shower, the desired spray pattern and in the desired direction. An individual sitting or reclining in the bathtub would not typically use the fixed shower head for cleansing or rinsing. Moreover, some bathtubs, particularly in older homes, do not, in any event, have a shower head which would be used even if desired. A shower-like spray nozzle or head for use by an individual sitting or reclining in the bathtub would therefore be highly useful. It would also be useful for assisting others, e.g., cleaning and rinsing children, handicapped individuals and/or the elderly or infirm.

Various devices have been proposed and constructed for providing a shower attachment for use with the bathtub faucet. In one such device, a flexible rubber coupling is placed around the bathtub faucet and has a hose connected to a shower head for hand use. This device, however, does not remain attached to the faucet. Typically, the water pressure forces the rubber tubing off the faucet, particularly if the rubber tubing is bent. Other devices of this type do not provide for a watertight seal and frequently allow water to spray outside of the bathtub at the point of connection. These devices can become completely disconnected under normal water pressure. Such prior devices also pose special problems. For example, if the spray head is submerged in the bathtub water and the supply of water to the spray head is interrupted, the water supply could become contaminated by a back-siphoning of the water from the bathtub to the water supply. Consequently, there is a demonstrable need for an effective shower system for use in connection to and disconnection from a conventional bathtub faucet.

DISCLOSURE OF THE INVENTION

The present invention provides a bathtub shower system which provides a readily and easily accessible shower-type spray head for use by an individual sitting or reclining in a bathtub, which may be readily installed in new or existing bathtubs, affords continued use of the bathtub faucet without complete removal of the system, can be easily connected to and disconnected from the bathtub faucet, is watertight and can withstand the force of the water pressure without leaking or disconnecting from the faucet, does not require the use of a shower curtain, has a hose of sufficient length enabling use by an individual in a sitting or reclining position in the bathtub, ensures the safety of the water supply and can be easily stored in bathroom areas, e.g., in or under bathroom sinks, closets, drawers or the like, when not in use. A principal advantage of using the bathtub shower system of the present invention is that it provides the soothing and relaxing benefits normally associated with the use of a shower to an individual sitting or reclining in a bathtub.

For individuals preferring to use the bathtub instead of showering or in bathtubs that do not have a shower, the use of the bathtub shower system hereof provides a more convenient method of bathing and rinsing. For example, an individual washing his/her hair in a standard bathtub will frequently use a container, such as pitcher, to pour water over his/her head for rinsing. The present invention, however, provides a shower-type head readily accessible by the individual in the bathtub and which is manually manipulable by the individual reclining or sitting in the bathtub to direct a patterned spray of water as desired. In addition to its use as a personal shower system, the present invention provides for a more convenient method of showering, washing, rinsing or cleaning other persons, animals or objects. For example, the shower, washing and rinsing of a baby or a senior adult in a home environment, assisting in the shower and washing and rinsing of a person in a hospital or health care environment, the washing and rinsing of animals either in the home or commercial grooming or pet hospital environment and the washing or rinsing of any object in a cleaning tub or kitchen sink environment where the safety of the water supply is a concern constitute advantageous characteristics of the present invention.

The present invention also has the capability of being installed by a layman. It does not require a permanent installation or specially designed faucets or other materials. The present invention can be installed on most existing faucets and can be readily, easily and quickly disconnected for use in other faucet locations as the need arises. This portability reduces the need of additional nozzles for use in various locations around the home or workplace.

More particularly, the present invention is specifically adapted for use with bathtub faucets which have either internal or external threads about the outlet opening of the faucet. Thus, the shower system hereof includes a fitting having matching threads, for example, a fitting have male threads at one end for threaded engagement with female threads about the interior of the tub faucet outlet, whereby the fitting may be secured to the tub faucet. The opposite end of the fitting may comprise a portion of a quick connect/disconnect assembly. The fitting, of course, has a flow passage for flowing water from the tub faucet through the passage to the opposite end of the fitting. The system also includes a backflow preventer assembly having at one end a mating second portion of the quick connect/disconnect assembly for quick connection to and disconnection from the first quick connect/disconnect portion of the fitting. Thus, the fitting may be maintained on the faucet permanently while the backflow preventer assembly may be removable therefrom for use with other faucets having a similar type fitting. The backflow preventer assembly includes a second flow passage between its opposite ends for flowing water from the first flow passage of the fitting to the opposite end of the backflow assembly. The backflow assembly also includes a one-way or check valve in the second flow passage which prevents backflow of fluid through the second passage into the first passage, yet enables flow of fluid from the first passage through the second passage. The backflow assembly includes a coupling at its opposite end for connection to a spray nozzle assembly including a spray nozzle head at one end of a flexible hose and a connector at the opposite end of the hose for securement to the backflow coupling. With the foregoing described construction, it will be appreciated that the backflow preventer check valve prevents the siphoning of water into the water supply system from the tub should the spray nozzle head lie submerged in the water in the bathtub and there occur an interruption in the supply of water.

Conveniently, the present shower system enables the backflow preventer to be readily and quickly disconnected from the fitting. In this manner, water may flow through the faucet and fitting and the tub may be used in a conventional manner without the shower system of the present invention. The quick connect/disconnect, however, enables the system to be readily and easily installed or reinstalled whenever an individual sitting or reclining in the tube desired use of the shower spray head. It will also be appreciated that the spray nozzle assembly may have various on/off and flow controls that are typically provided with shower heads currently available. The foregoing specifically described structure may also be quickly installed by a layman, requiring only the screwthreading of the fitting to the tub faucet and application of the backflow preventer assembly to the fitting by using the quick connect/disconnect. This system can also be readily, simply and economically fabricated, for example, by using plastic materials.

In another form of the present invention, and instead of a number of discrete parts, the shower system hereof may include a backflow preventer having a screwthread at one end and a quick connect/disconnect at its opposite end. The screwthread at the end of the backflow preventer may thread directly to the threads of the bathtub faucet and, of course, may be either male or female threads, depending upon the threads of the bathtub faucet to which the system will be secured. In a preferred form, the quick connect/disconnect at the opposite end of the backflow preventer may comprise the female portion thereof with the male portion being provided integrally on the end of a shower head hose. Consequently, once the backflow preventer is screwthreaded to the faucet, the female and male portions of the quick connect/disconnect may be coupled to one another whereby the faucet supplies water through the backflow preventer, the quick connect/disconnect, hose and shower head to the individual sitting or reclining in the bathtub. It will be appreciated, of course, that the quick connect/disconnect male and female portions can be reversed, with the male portion on the backflow preventer and the female portion forming an integral part of the hose of the shower head. The female portion is, however, preferably formed on the end of the backflow preventer because it prevents upward spray and is also an easier connection method, i.e., the connecting movement is an upward direction relative to the faucet.

In a preferred form of the present invention, there is provided a bathtub shower system for connection to a bathtub faucet having a threaded outlet opening, comprising a fitting for screwthreaded engagement at one end with the threaded outlet opening of the bathtub faucet and having a first portion of a quick connect/disconnect at an opposite end thereof, the fitting having a first flow passage for flowing a fluid between opposite ends thereof, a backflow preventer assembly having a mating second portion of the quick connect/disconnect at one end thereof for quick connection to and disconnection from the first quick connect/disconnect portion of the fitting, the assembly having a second flow passage in communication with the first flow passage when the fitting and assembly are connected to one another for flowing the fluid from the fitting through the backflow assembly, the backflow preventer assembly containing a valve preventing flow of fluid from the second flow passage into the first flow passage and enabling flow of fluid from the first flow passage through the second flow passage for flow outwardly of the backflow assembly at an end thereof opposite one end of the backflow assembly, the opposite end of the backflow assembly including a spray nozzle head connection and a spray nozzle assembly having a nozzle spray head at one end of a flexible hose and a coupling at an opposite end of the flexible hose for coupling the spray nozzle head and the backflow assembly to one another.

In a further preferred embodiment according to the present invention, there is provided a bathtub shower system for connection to a bathtub faucet having a threaded outlet opening, comprising a backflow preventer for screwthreaded engagement at one end with the threaded outlet opening of the bathtub faucet, a quick connect/disconnect, the backflow preventer having a first portion of the quick connect/disconnect at an opposite end thereof and a first flow passage for flowing a fluid from one end to the opposite end thereof, the backflow preventer having a valve for preventing flow of fluid from the opposite end to one end thereof, a spray nozzle assembly having a nozzle spray head at one end of a flexible hose and a coupling at an opposite end of the flexible hose for coupling the spray nozzle head and the backflow preventer to one another, the hose coupling including a mating second portion of the quick connect/disconnect for quick connection to and disconnection from the first quick connect/disconnect portion of the backflow preventer, the quick connect/disconnect having a second flow passage in communication with the first flow passage when the backflow preventer and quick connect/disconnect are connected to one another for flowing the fluid from the faucet through the backflow preventer and quick connect/disconnect to the spray nozzle head.

In a still further preferred embodiment according to the present invention, there is provided a water flow system for connection to a faucet having a threaded outlet opening, comprising a backflow preventer having a first end and a second end opposite the first end and a flow passage between the ends for flowing a liquid from the first end to the second end, a valve in the backflow preventer flow passage for preventing flow of liquid from the second end to the first end, first means for connecting the backflow preventer at one end thereof to the faucet, second means for connecting the backflow preventer at the opposite end to a spray nozzle assembly, one of the first means and the second means comprising a quick connect/disconnect having a female portion and a male portion insertable into the female portion for releasable securement of the female and male portions to one another, each female and male portion having a passageway therethrough for communicating one with the other upon releasable securement of the female and male portions to one another and lying in communication with the flow passage through the backflow preventer.

Accordingly, it is a primary object of the present invention to provide a novel and improved quick connect bathtub shower system having a shower head and a flexible hose which can be readily and easily connected to and disconnected from an existing bathtub faucet in a manner which attains all the advantages of a conventional shower head, eliminates the potential for backflow of contaminated water from the bathtub into the water supply should there be an interruption in that water supply, and enables an individual sitting or reclining in the bathtub to manually manipulate a shower head for bathing and rinsing.

BRIEF DESCRIPTION OF THE DRAWINGS

FIG. 2 is a schematic illustration of the application of the system to an existing bathtub faucet where the faucet has internal threads;

FIG. 2A is a view similar to FIG. 2 illustrating application of the system to a tub faucet having external threads;

BEST MODE FOR CARRYING OUT THE INVENTION

Figure 1:
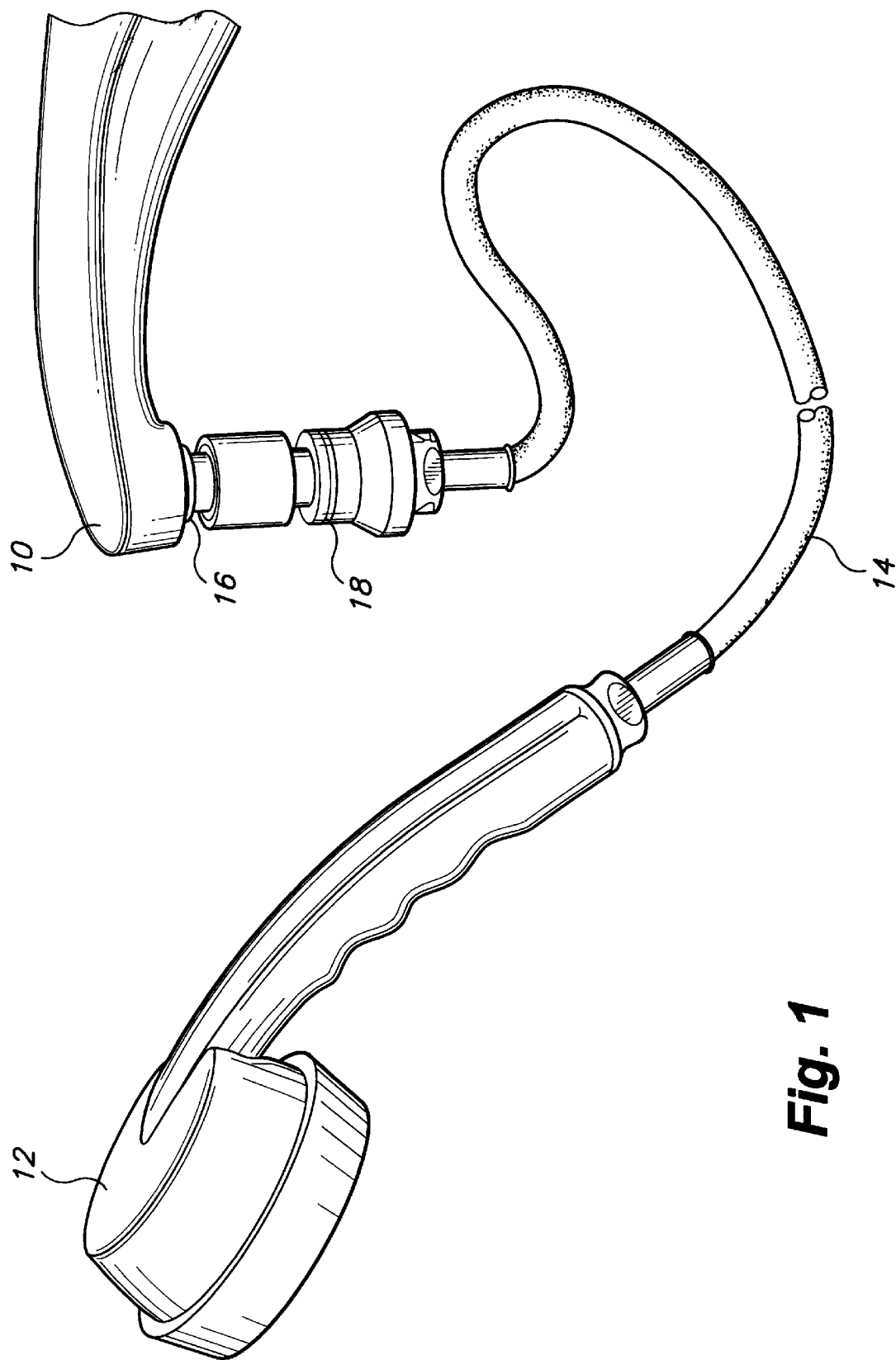
FIG. 1 is a perspective view of a bathtub shower system according to the present invention with parts broken out for ease of illustration.

Referring now to the drawings, and particularly to FIG. 1, there is illustrated a bathtub shower system according to the present invention for connection to a tub faucet 10 whereby water may flow from the tub faucet through the system to a shower head 12. The shower head 12 may be any conventional hand-held type coupled to a hose 14 and having various types of spray nozzles for altering the flow of water through the nozzle head. The system includes a fitting 16 and a backflow assembly 18 for connection to the faucet 10 and the shower head 12, respectively.

Referring to FIG. 2, the system includes a fitting 16 which, at one end, has a male threaded portion 20 for threaded engagement with female threads 21 on the interior of the tub faucet outlet. It will be appreciated that conventional tub faucets typically have internal female threads adjacent their outlets. The fitting includes a first flow passage 22 passing axially therethrough for flowing water from the faucet 10 to the backflow assembly 18 when the fitting and backflow assembly are coupled one to the other. The opposite end of the fitting 16 from the male threaded end 20 forms part or a first portion 23 of a quick connect/disconnect between the fitting 16 and the backflow assembly 18.

The backflow preventer assembly 18 includes at one end a part of second portion 24 of the quick connect/disconnect for coupling the backflow assembly 18 and the fitting 16 to one another. The second portion 24 may include a retractable sleeve 26 which is spring-biased into an extended position as illustrated. The sleeve 26 surrounds an internal sleeve 28 defining a second flow passage 30 through the backflow assembly 18. The quick connect/disconnect first portion 23 of fitting 16 includes a sealing gasket 32 and an annular shoulder 34 which cooperate when inserted into sleeve 28 to provide a sealed connection between fitting 16 and backflow preventer 18. The quick connect/disconnect portions 23 and 24 are conventional in construction and, for example, may be of the type conventionally sold for hose couplings manufactured by Gardena.

Referring to FIG. 2A, the fitting 16a of a further form of the present invention may have a quick connect/disconnect first portion 23a similarly as previously described at an end thereof opposite its connection to the faucet 10a. In this form, the faucet 10a has a depending male threaded projection 36 which is received in a female threaded coupling 38 of fitting 16a. Thus, fittings 16 and 16a are applicable to standard tub faucets having female or male threads, respectively.

Figure 3:
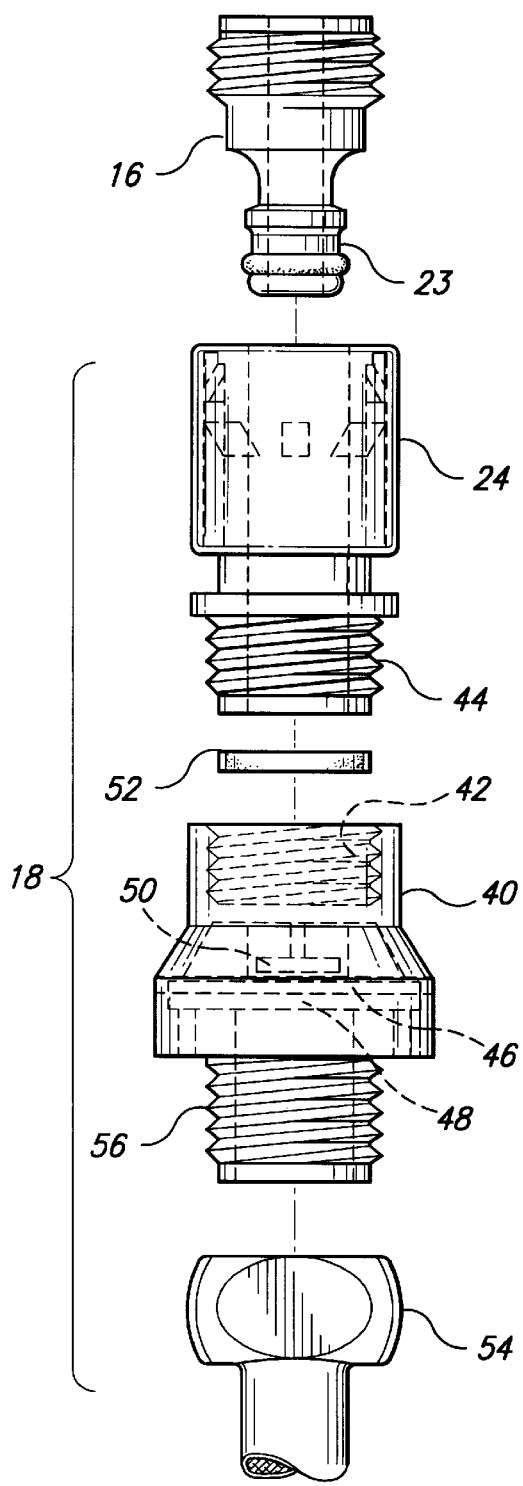
FIG. 3 is a side elevational view of various component parts of the system.
Figure 4:
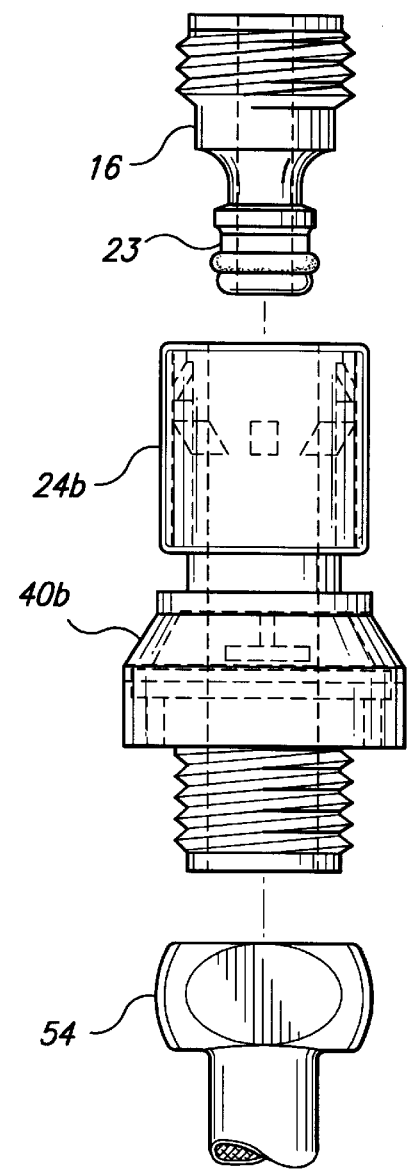
FIG. 4 is a view similar to FIG. 3 illustrating a further form of the present invention.

Referring to FIGS. 3 and 4, the backflow preventer assembly 18 includes at its upper end the quick connect/disconnect portion 24 and as illustrated in FIG. 3, a separate backflow preventer 40. The backflow preventer 40 has an opening at one end with female threads 42 for receiving the male threads 44 at the end of the quick connect/disconnect 24. The backflow preventer includes an annular flexible member 46 within an axially extending flow passage, the member 46 having a central opening 48. Opening 48 is located below, i.e., downstream of, a solid disk 50 which projects over the opening 48. Consequently, when flow passes through the flow passage, for example, in a downstream direction as illustrated in FIG. 3, the flexible annular ring 46 is spaced from the disk 50 whereby the flow passes about the margins of disk 50 and the interior wall surfaces of the flow passage through the central opening 48 of the annular member 46 for flow through the lower end of the backflow preventer. A sealing washer 52 is illustrated for disposition between the quick connect/disconnect portion 24 and the backflow preventer when the former is screwthreaded into the latter. Also illustrated is a female connector 54 having internal threads for screwthreaded engagement with the male threads 56 at the downstream end of the backflow preventer. The connector 54 forms part of the hose 14 at an end thereof remote from the shower head 12.

When these various parts are assembled, it will be appreciated that the fitting 16 is screwthreaded into the faucet 10 and the quick connect/disconnect portion 24 is screwthreaded to the backflow preventer 40. The connector 54 for the shower head is also screwthreaded to the backflow preventer 40. The backflow preventer assembly 18 is then releasably secured to the fitting 16 using the quick connect/disconnect, e.g., by coupling portions 23 and 24 to one another. Consequently, water may flow from the tub faucet 10 through the system to the shower head 12 for use by an individual reclining or sitting in the bathtub. Should the water supply be interrupted and the shower head remain in the tub under water, the backflow preventer prevents the siphoning of water from the tub through the system into the water supply, thereby preventing contamination of the water supply.

Referring to FIG. 4, there is illustrated a further form of the system hereof. In this form, the fitting 16 and the hose connection 54 are identical as previously described with respect to FIG. 3. The functionality of the backflow preventer is likewise identical as previously described. In this form, however, the quick connect/disconnect portion 24b forms an integral part of the backflow preventer 40b. Thus, the screwthreaded connection 42 and 44 between the quick connect/disconnect portion 24 and the backflow preventer 40 is eliminated in the embodiment hereof illustrated in FIG. 4 and those parts are integrally formed.

Figure 6:
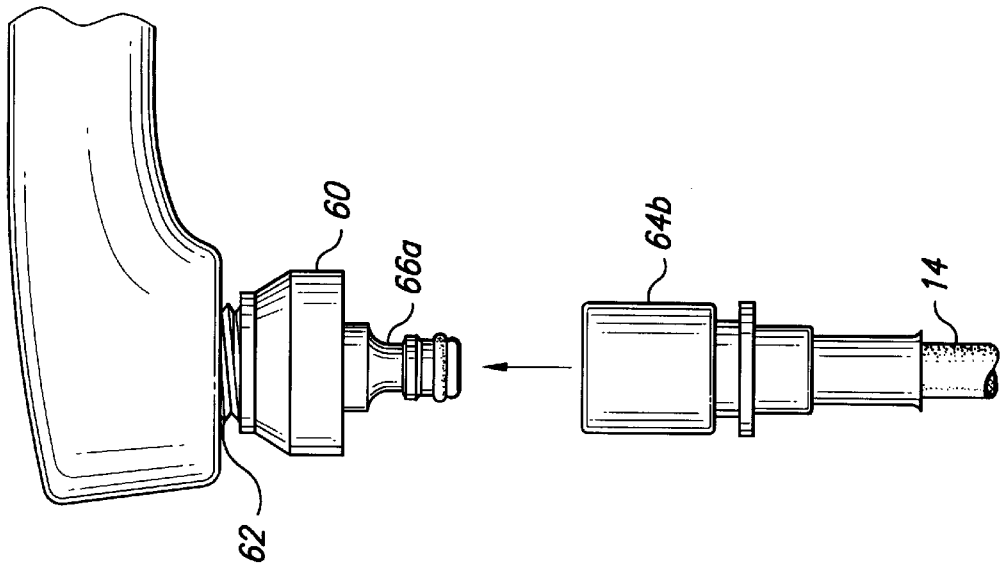
FIG. 6 is a view similar to FIG. 5 illustrating the reverse assembly of the quick connect/disconnect of FIG. 5.
Figure 5:
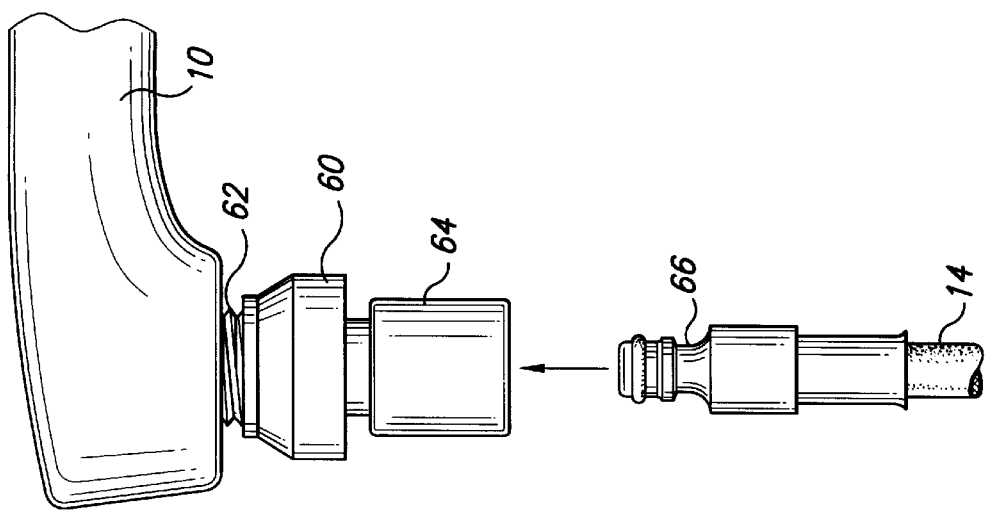
FIG. 5 is a fragmentary side elevational view of a bathtub shower system according to a further form of the present invention.

Referring to FIGS. 5 and 6, there is provided a more integrated form of the shower system of the present invention. In this form, the backflow preventer 60 may be of a similar type as previously described. However, instead of a portion of the quick connect/disconnect being provided on its upper end, the backflow preventer 60 may have the male threads 62 for direct connection to the female threads of the faucet 10, the male threads 62 forming an integral part of the backflow preventer 60. The opposite end of the backflow preventer 60 is provided with a quick connect/disconnect assembly for coupling the backflow preventer 60 to the spray nozzle assembly. To accomplish this, the downstream end of the backflow preventer 60 may have the female portion 64 of a quick connect/disconnect. A male portion 66 of the quick connect/disconnect is then provided on the end of the hose 14 for the spray nozzle head.

With the foregoing described arrangement, it will be appreciated that the backflow preventer 60 may be screwthreaded to the faucet 10 by threading the male threads 62 into the female threads of the faucet 10. With the male portion 66 of the quick connect/disconnect on the hose 14, the shower head can be readily connected to the backflow preventer by inserting the male portion 66 upwardly, while simultaneously retracting the female portion 64. Once this connection is effected, the water may flow from the faucet 10, through the backflow preventer 60, the quick connect/disconnect and the shower head, with the assurance that should there be an interruption in the water supply, the backflow preventer 60 will prevent any siphoning of water from the bathtub into the water supply system.

As illustrated in FIG. 6, the backflow preventer 60 may be provided with the male portion 66a of the quick connect/disconnect, while the hose 14 may be provided with the female portion 64a of the quick connect/disconnect. Consequently, FIG. 6 illustrates the reversal of the male and female portions of the quick connect/disconnect in comparison with the form of the invention illustrated in FIG. 5. It will also be appreciated that the male threads 62 and female threads on the faucet 10 may be reversed, depending upon whether the faucet has male or female threads. The arrangement set forth in FIG. 5 is preferred, however, because the female connection 64 prevents upward spray at the connection and also affords an easier connection method by requiring movement of the male and female portions of the quick connect/disconnect in an upward direction. It will also be appreciated that the quick connect/disconnect may comprise a separate unit for connection between the backflow preventer and the hose of the spray head. For example, the male portion 66 of the quick connect/disconnect may have a threaded male projection at the opposite end of its connection with female portion 64 for threaded connection with the connector 54 of a standard shower spray nozzle. Similarly, the female portion 64a of the quick connect/disconnect may have a male threaded portion at its opposite end for threaded connection with the connector 54 of the spray head.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A bathtub shower system for connection to a bathtub faucet having a threaded outlet opening, comprising:

a fitting for screwthreaded engagement at one end with the threaded outlet opening of the bathtub faucet and having a first portion of a quick connect/disconnect at an opposite end thereof, said fitting having a first flow passage for flowing a fluid between opposite ends thereof;

a backflow preventer assembly having a mating second portion of said quick connect/disconnect at one end thereof for quick connection to and disconnection from said first quick connect/disconnect portion of said fitting, said assembly having a second flow passage in communication with said first flow passage when said fitting and assembly are connected to one another for flowing the fluid from said fitting through said backflow assembly, said backflow preventer assembly containing a valve preventing flow of fluid from said second flow passage into said first flow passage and enabling flow of fluid from said first flow passage through said second flow passage for flow outwardly of said backflow assembly at an end thereof opposite said one end of said backflow assembly, said opposite end of said backflow assembly including a spray nozzle head connection; and a spray nozzle assembly having a nozzle spray head at one end of a flexible hose and a coupling at an opposite end of said flexible hose for coupling said spray nozzle head and said backflow assembly to one another.

2. A system according to claim 1 wherein said fitting has external threads at said one end for threaded connection with internal threads of said tub faucet.

3. A system according to claim 1 wherein said fitting has internal threads at said one end for threaded connection with external threads of said tub faucet.

4. A system according to claim 1 wherein said backflow assembly is formed integrally with said second portion of said quick connect/disconnect.

5. A system according to claim 1 wherein said spray nozzle head connection includes a threaded male portion projecting from said backflow assembly.

6. A system according to claim 1 in combination with a bathtub faucet having a threaded outlet opening for screwthreaded engagement with said fitting.

7. A water flow system for connection to a faucet having a threaded outlet opening, comprising:

a backflow preventer having a first end and a second end opposite said first end and a flow passage between said ends for flowing a liquid from said first end to said second end, a valve in said backflow preventer flow passage for preventing flow of liquid from said second end to said first end;

a spray nozzle assembly having a nozzle spray head at one end of a flexible hose and a coupling at an opposite end of said flexible hose for coupling said spray nozzle head and said backflow preventer to one another;

first means for connecting said backflow preventer at said one end thereof to the faucet;

second means for connecting said backflow preventer at said opposite end to said spray nozzle assembly coupling;

one of said first means and said second means comprising a quick connect/disconnect having a female portion and a male portion, each said female and male portion having a passageway extending axially therethrough, said male portion being axially insertable into said female portion for releasable securement of said female and male portions to one another without relative rotation therebetween and with said axially extending passageways communicating one with the other and with the flow passage through the backflow preventer, one of said male portion and said female portion being formed integrally with said backflow preventer.

8. A system according to claim 7 in combination with a bathtub faucet having an internally threaded outlet opening, said female portion being formed integrally with said backflow preventer, said male portion having external threads for threaded engagement with said internally threaded outlet opening of said faucet.

* * * * *